United States Patent [19]

Wicklund

[11] Patent Number: 5,014,260
[45] Date of Patent: May 7, 1991

[54] METHOD AND APPARATUS FOR PREVENTING TRANSMISSION OF DATA PACKETS WITH A GREATER INTENSITY THAN A PREDETERMINED VALUE ON ANY ONE OF A NUMBER OF CHANNELS ON A COMMON TRANSMISSION LINK

[75] Inventor: Rolf G. Wicklund, Sollentuna, Sweden

[73] Assignee: Telefonaktiebolaget L M Ericsson, Stockholm, Sweden

[21] Appl. No.: 422,906

[22] Filed: Oct. 18, 1989

[30] Foreign Application Priority Data

Oct. 28, 1988 [SE] Sweden ................................. 8803875

[51] Int. Cl.$^5$ ............................ H04J 1/16; H04J 3/14; H04J 3/24
[52] U.S. Cl. .................................... 370/13; 370/94.1
[58] Field of Search ............................ 370/94.1, 16, 84

[56] References Cited

U.S. PATENT DOCUMENTS

| 4,766,591 | 8/1988 | Huang | 370/85.6 |
| 4,839,891 | 6/1989 | Kobayashi et al. | 370/94.1 |
| 4,849,968 | 7/1989 | Turner | 370/94.1 |
| 4,896,316 | 1/1990 | Lespagnol et al. | 370/94.1 |

Primary Examiner—Douglas W. Olms
Assistant Examiner—Wellington Chin
Attorney, Agent, or Firm—Burns, Doane, Swecker & Mathis

[57] ABSTRACT

A method and apparatus for preventing transmission of data packets with a greater intensity than a given value assigned to each channel on any one of a number of channels on a common transmission link. A variable counter value (r) is associated with each channel. This counter value is increased for a given channel by a predetermined value (I) when a data packet arrives at this channel. The counter values (r) for all channels are decreased at uniform intervals by a value (d), which is less than the predetermined value (I). Data packets arriving at a channel, the counter value (r) of which exceeds a given limiting value (C), are rejected.

34 Claims, 2 Drawing Sheets

METHOD AND APPARATUS FOR PREVENTING TRANSMISSION OF DATA PACKETS WITH A GREATER INTENSITY THAN A PREDETERMINED VALUE ON ANY ONE OF A NUMBER OF CHANNELS ON A COMMON TRANSMISSION LINK

TECHNICAL FIELD OF THE INVENTION

The invention relates to a method and apparatus for preventing transmission of data packets with a greater intensity than a predetermined value for the channel on any one of a number of channels on a common transmission link.

BACKGROUND OF THE INVENTION

A transmission link which is used for asynchronous transfer mode (ATM) transmission is divided, with regard to time, into a plurality of successive cells. When such a link is used for transmitting data packets on several channels, each channel is identified with the aid of an address field in each cell. If packets with different intensities are set on different channels, an individual bandwidth is obtained for each channel. The sum of the bandwidths of all channels must therefore be less than the maximum bandwidth of the link. In order that one channel not interfere with remaining channels by utilizing a bandwidth which is too great, it is desirable for the channels to be monitored so that packets with higher intensity than what was initially determined for the respective channel are not sent on any channel.

SUMMARY OF INVENTION

The object of the present invention is to provide a method and apparatus for preventing data packets with a higher intensity than a predetermined value from being sent on any one of the channels on a transmission link. This object is achieved by the provision of a variable counter value associated with each channel. This value is varied by a given amount in one direction when a data packet arrives, and is changed by a lesser amount at uniform intervals in the other direction. Data packets arriving at a channel where its counter value has passed a given limiting value are rejected.

BRIEF DESCRIPTION OF DRAWINGS

The invention will now be described in more detail, and with reference to the drawings, where.

THE PREFERRED EMBODIMENT

Figure 1:
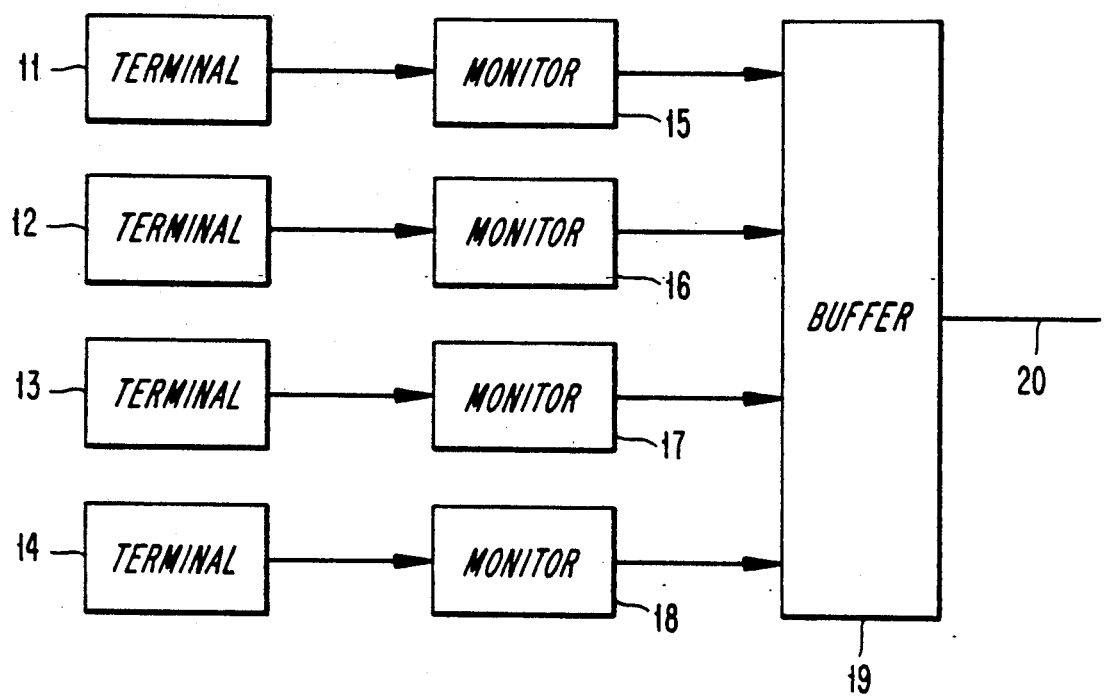
FIG. 1 illustrates a plurality of terminals which are connected by a transmission link.

In FIG. 1 there is illustrated a plurality of terminals 11-14, which are arranged to transmit data packets. Via their individual monitoring means 15-18 the terminals are connected to a buffer means 19, which in turn is connected to a transmission link 20. This link is thus utilized for transmitting several different channels. One or more of the terminals 11-14 can be replaced by a transmission link, however, whereby the channels on the link 20 do not need to come from the illustrated terminals. The monitoring means 15-18 are arrranged to monitor the intensity with which data packets arrive at the different channels and to prevent data packets being transmitted with too great intensity.

Figure 2:
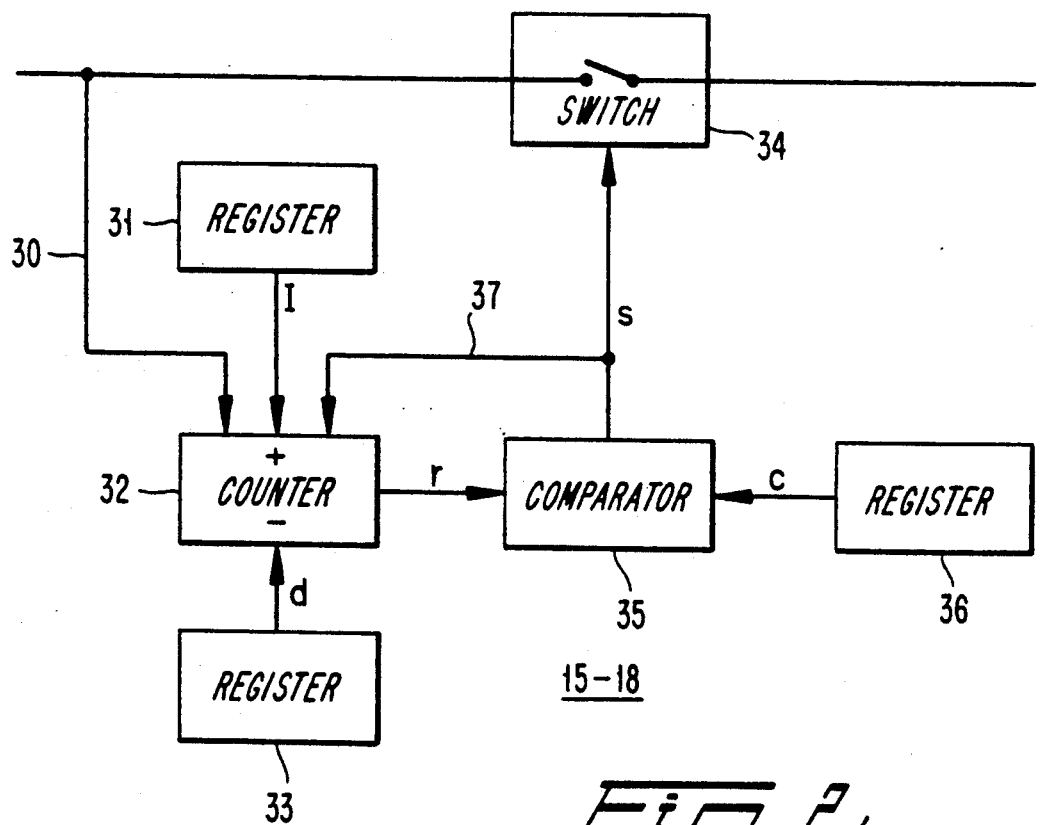
FIG. 2 illustrates an apparatus in accordance with the invention and FIG. 3 illustrates the function of the apparatus according to FIG. 2.

In FIG. 2 there is illustrated an embodiment of a monitoring means according to the above. An up/down counter 32 is included in each monitoring means, a variable counter value r being calculated in each counter. For each data packet arriving at the channel with which the monitoring means is associated, the counter value in the counter 32 is increased by a predetermined value I, which is stored in a register 31. The value I is consequently applied to an up-counting input on the counter. Detection of an arriving data packet and the associated activation of the counter have been denoted symbolically by a conductor 30. The counter value is decreased at uniform intervals by a predetermined value, which is less than the value I, and which is stored in a register 33. The value d is consequently supplied to a down-counting input on the counter 32. No activation conductor or activation means for the down-counting have been denoted in the figure.

The counter value r in the counter 32 is compared in a comparator 35 with a predetermined value C, which is stored in a register 36. If the counter value r exceeds the value C, a special control signal s is generated on the output of the comparator 35. A data packet arriving on a channel having a counter value exceeding the value C is rejected, i.e. it is prevented from being transmitted. This is done with the aid of a controllable switching element 34, which assumes an open state when the control signal s occurs on the comparator output. The rejected data packets are thus not stored in any buffer in the monitoring means. The control signal s also acts on the counter 32 so that the counter value of does not increase further when it exceeds the value C. This action is symbolically denoted by a conductor 37. After the counter value r has exceeded the value C, no new data packets will be transmitted before the counter value has decreased below the value C. There is thus obtained a function which prevents data packets with a greater intensity than a predetermined value being sent on the channel in question.

Figure 3:
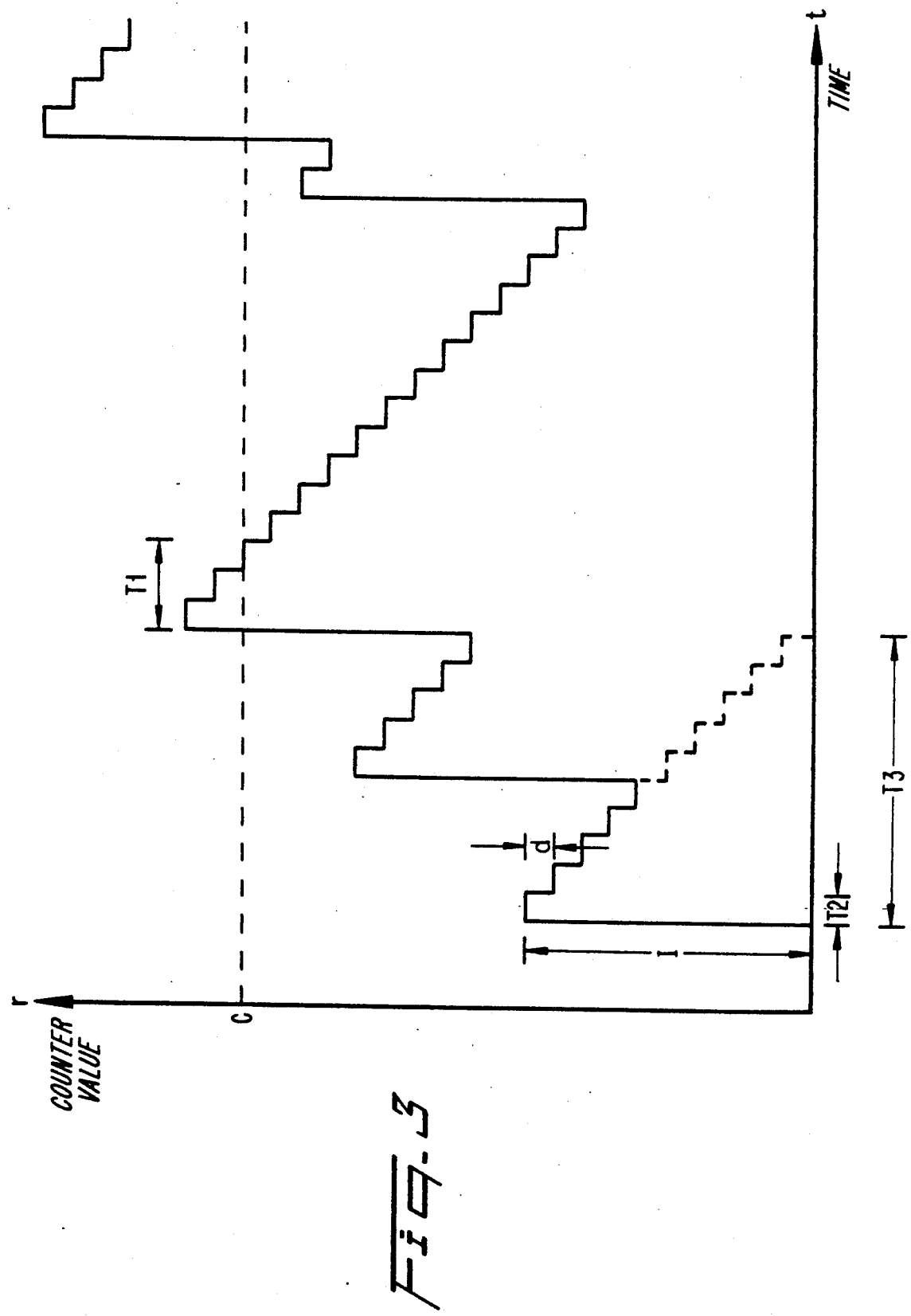

In FIG. 3, a diagram illstrates the function of a monitoring means in accordance with FIG. 2. The diagram shows an example of the counter value r as a function of the time t. For each arriving data packet the counter value is increased, at least to start with, by the value I, and is reduced at uniform intervals by the lesser value d. However, each counter is arranged such that its counter cannot fall below the value zero.

In accordance with the example, the counter value r is greater than the comparison value C, inter alia during the time period T1. If a data packet arrives during such a time period, it is rejected, i.e. it is not transmitted, as explained above.

The down-counting value d, by which the counter value r in the counter 32 is decreased at uniform intervals, can be individually preset for each monitoring means, i.e. for each channel. An individual bandwidth is thus obtained for each channel, and as explained below, it can be proportional to the down-counting value d. The comparison value C can also be individually preset for each channel, which allows bursts of different magnitudes to be accepted on the different channels. On the other hand, the channel bandwidth is not affected by this value.

Different hardware embodiments can have different amounts of individual components depending on how many different parameters are preset for each channel.

For example, each of the registers 31, 33 and 36 could be common to several monitoring means, if the parameter values of the registers do not need to be specifically preset for to individual channels.

In FIG. 3 the time space between two down-counts is denoted by T2 and the means time space between two incoming data packets on a channel by T3. In addition, if L denotes the packet length in number of bits and B the top value for the bandwidth on a given channel, there is obtained: $T3=L/B$. Also applicable is that $d/T2=I/T3$, and in this combination with the first equation gives: $d/T2=I\times B/L$, or $B=(L\times d)/(I\times T2)$.

In a hardware embodiment, it is desirable that there be as few parameters specific to individual channels as possible. If only the down-counting value d is individually specific to channels, the bandwidth B will be directly proportional to the down-counting value d.

The comparison value C depends on the greatest permitted number of data packets in a burst, this number being denoted by A, and on the up-counting value I. Applicable here is that $C=(A-1)\times I$. The value C is thus independent of the channel, if the number of permitted data packets is common for all channels.

A numerical example is as follows:
L(packet length) = 35 bytes = 280 bits
Greatest channel bandwidth = 600 Mbits/s
Least channel bandwidth = kbits/s The counting-up value I is calculated as the ratio between greatest and least channel bandwidth:

$$I = 600\times 10^6/64\times 10^3 = 9375$$

$T2=(L\times d)/(I\times B)=(280\times 1)/(9375\times 64\times 10^3)=467$ ns. This is explained by $d=1$ corresponding to the bandwidth 64 kbits/s.

If the magnitude A, i.e. the greatest permitted number of packets in a burst, equals 4, there is obtained: $C=(4-1)\times 9375=28125$, and the greatest counter value will be $4\times 9375=37500$.

The invention is of course not restricted to the embodiment described above, and can be modified within the scope of the claims. For example, it can be alternatively arranged so that the above-mentioned counter value is decreased instead of being increased when a data packet arrives, and that the counter value is, at uniform intervals increased, instead of decreased by a lesser value. The comparison value C will thus be passed from above instead of from below, if data packets arrive with too great intensity. Likewise, the counter 32 can be replaced by some other suitable adding and subtracting means with a variable counter value r.

I claim:

1. A method of preventing transmission of data packets when a number of data packets per unit time exceeds a predetermined value associated with each one of a plurality of channels on a common transmission link, comprising:
   (a) associating with each channel a variable first value;
   (b) increasing said associated first value for a given channel by a predetermined second value when a data packet arrives at said given channel; and
   (c) selectively activating a switch to prohibit transmission of data packets that arrive at a channel whose associated first value exceeds said predetermined value.

2. The method as defined in claim 1, further comprising:
   (d) decreasing at uniform time intervals said first value by a third value which is less than said second value.

3. The method as claimed in claim 2, wherein said third value is individually preset for each channel.

4. The method according to claim 1, further comprising:
   (e) prohibiting the increase of said first value when said first value exceeds said predetermined value.

5. The method according to claim 4, further comprising:
   (f) permitting said first value to be increased when said first value is reduced to less than said predetermined value.

6. The method as claimed in claim 1, wherein said predetermined value is individually preset for each channel.

7. The method as defined in claim 1, wherein each said first value is related to the bandwidth allowed for its associated channel, such that the sum of said first values for all of the channels on said link is less than the maximum bandwidth of said link.

8. An apparatus for preventing transmission of data packets when a number of data packets per unit time exceeds a predetermined first value associated with each one of a plurality of channels on a common transmission link, comprising:
   a plurality of monitors with one monitor associated with each channel; and
   each of said monitors including:
   means for storing said predetermined first value and a second value;
   a variable counter, connected to said storing means, for increasing a counter value by said second value when a data packet arrives on the associated channel, said counter value corresponding to a number of data packets per unit time to be transmitted over the associated channel;
   a comparator for comparing said counter value with said predetermined first value; and
   switching means selectively activated by said comparator for prohibiting transmission of data packets over the associated channel when said counter value exceeds said predetermined first value.

9. The apparatus as defined in claim 8, further comprising:
   means for decreasing said counter value by a third value at uniform time intervals, said third value being stored in said storing means and being less than said second value.

10. The apparatus according to claim 9, wherein said memory means includes first, second and third registers which store said first, second and third values, respectively.

11. The apparatus according to claim 9, wherein said third value is individually preset for each channel.

12. The apparatus according to claim 8, further comprising:
    means for prohibiting the increase of said counter value when said counter value exceeds said predetermined first value.

13. The apparatus according to claim 8, further comprising:
    means for permitting said counter value to be increased when said counter value is reduced to less than said predetermined first value.

14. The apparatus according to claim 8, wherein said predetermined first value is individually preset for each channel.

15. The apparatus according to claim 8, wherein each said second value is related to the bandwidth allowed for its associated channel, such that the sum of said values for all of the channels on said link is less than the maximum bandwidth of said link.

16. A method of preventing transmission of data packets when a number of data packets per unit time exceeds a predetermined limit value associated with each one of a plurality of channels on a common transmission link, comprising:
   (a) associating with each channel a variable first value;
   (b) decreasing said associated first value for a given channel by a predetermined second value when a data packet arrives at said given channel;
   (c) selectively activating a switch to prohibit transmission of data packets that arrive at a channel whose associated first value is less than a predetermined third value.

17. The method as defined in claim 16, further comprising:
   (d) increasing at uniform time intervals said first value by a fourth value which is less than said second value.

18. The method as claimed in claim 17, wherein said fourth value is individually preset for each channel.

19. The method according to claim 16, further comprising:
   (e) prohibiting the decrease of said first value when said first value is less than said third value.

20. The method according to claim 19, further comprising:
   (f) permitting said first value to be decreased when said first value is increased to exceed said third value.

21. The method as claimed in claim 16, wherein said third value is individually preset for each channel.

22. The method as defined in claim 16, wherein each said first value is related to the bandwidth allowed for its associated channel, such that the sum of said first values for all of the channels on said link is less than the maximum bandwidth of said link.

23. An apparatus for preventing transmission of data packets when a number of data packets per unit time exceeds a predetermined limit value associated with each one of a plurality of channels on a common transmission link, comprising:
   a plurality of monitors with one monitor associated with each channel;
   each of said monitors including:
   means for storing predetermined first and second values;
   a variable counter, connected to said storing means, for decreasing a counter value by said first value when a data packet arrives on the associated channel, said counter value corresponding to a number of data packets per unit time to be transmitted over the associated channel;
   a comparator for comparing said counter value with said second value; and
   switching means selectively activated by said comparator for prohibiting transmission of data packets over the associated channel when said counter value is less than said second value.

24. The apparatus as defined in claim 23, further comprising:
   means for increasing said counter value by a third value at uniform time intervals, said third value being stored in said storing means and being less than said first value.

25. The apparatus according to claim 24, wherein said memory means includes first, second and third registers which store said first, second and third values, respectively.

26. The apparatus according to claim 24, wherein said third value is individually preset for each channel.

27. The apparatus according to claim 23, further comprising:
   means for prohibiting the decrease of said counter value when said counter value is less than said second value.

28. The apparatus according to claim 23, further comprising:
   means for permitting said counter value to be decreased when said counter value is increased to exceed said second value.

29. The apparatus according to claim 23, wherein said second value is individually preset for each channel.

30. The apparatus according to claim 23, wherein each said first value is related to the bandwidth allowed for its associated channel, such that the sum of said first values for all of the channels on said link is less than the maximum bandwidth of said link.

31. A method of monitoring transmission of data packets over each individual channel in a multiple channel transmission link, comprising:
   (a) storing a value relating to transmission of data packets for each channel in said link;
   (b) changing said value for a given channel in one direction by a first predetermined amount when a data packet arrives at said given channel;
   (c) changing said value for said given channel in the opposite direction by a second predetermined amount at uniform time intervals;
   (d) montoring said value for each channel; and
   (e) selectively activating a switch to prohibit transmission of data packets that arrive at a channel whose associated said value exceeds a threshold in said one direction.

32. The method according to claim 31, wherein said first predetermined amount is related to the bandwidth assigned to a given channel, such that the sum of said first amounts for all of the channels in said link is less than the maximum bandwidth of said link.

33. The method according to claim 31, further comprising:
   (f) prohibiting changing said value in said one direction when said value is greater than said threshold.

34. The method according to claim 33, further comprising:
   (g) permitting changing said value in said one direction when said value is less than said threshold.

* * * * *